United States Patent [19]
French

[11] 3,808,621
[45] May 7, 1974

[54] SWIMMER'S VIEWING FLOAT

[76] Inventor: Park French, 59 S. Chillicothe Rd., Aurora, Ohio 44202

[22] Filed: Nov. 24, 1972

[21] Appl. No.: 309,194

[52] U.S. Cl.................. 9/310 H, 114/66, 350/319
[51] Int. Cl.............................................. B63b 35/72
[58] Field of Search...... 9/310 H, 311, 312; 114/66; 350/319

[56] References Cited
UNITED STATES PATENTS
2,717,399   9/1955   Backhouse........................ 9/310 H FOREIGN PATENTS OR APPLICATIONS
1,254,432   1/1961   France................................ 114/66
428,636   12/1947   Italy.................................... 9/310 H
514,000   2/1955   Italy......................................... 9/311
972,680   1/1951   France................................ 9/310 H

*Primary Examiner*—Milton Buchler
*Assistant Examiner*—Paul E. Sauberer
*Attorney, Agent, or Firm*—Donnelly, Maky, Renner & Otto

[57] ABSTRACT

A swimmer's viewing float having generally spherical facing upper and lower parts, the latter being transparent and the former having a transparent concave viewing port. The concave shape of the viewing port prevents direct reflection of overhead light by the viewing port surfaces from entering the swimmer's field of view. The field of view is also shielded against reflection of overhead light by the lower part by making the upper part non light transmitting and/or an intermediate masking partition. The float can be rigid or wholly or partially collapsible and air inflatable.

13 Claims, 4 Drawing Figures

PATENTED MAY 7 1974 3,808,621

SWIMMER'S VIEWING FLOAT

This invention relates, as indicated, to a buoyant or float device having underwater viewing means permitting a swimmer while buoyed by embracing the same to view submerged objects.

Simple devices on this order have been proposed in which the equivalent of rafts, usually inflatable in use, have flat transparent sections to provide a degree of underwater viewing to a person lying prone on the same. Such underwater viewing devices are shown, for example, in U.S. Pat. Nos. 2,712,139, 2,717,399, and 3,081,726. They are commonly limited by the fact that the transparent or viewing sections are flat, incurring an apparent distance error when in contact with water and, moreover, having little if any shielding or reflected light. Such reflection of light from the sun or sky produces visual interference and is on this account undesirable.

The viewing devices of such prior art are, additionally, not swimmers' floats in the sense of being used by a person actually in the water, since they are expressly designed in rectangular shapes of sufficient size to support one, or even two, persons fully thereon when used. As a result, they are fairly large and bulky and have limited maneuverability.

Masks, both with and without curved viewing ports, are, of course, also well-known and commonly used, but these, besides not being particularly comfortable at least for all persons, require at least partial submersion of the swimmer's head in the water.

It is, therefore, a principal object of the present invention to provide a swimmer's float which is of relatively small size as compared, for example, to the aforementioned rafts, and permits clear viewing of underwater objects by the swimmer with his head supported above the surface of the water. Such device thus provides unrestricted breathing, without the inconvenience of a mask or other attachment to the head of the swimmer.

It is an object of the invention to provide a viewing float having at least one transparent upper viewing port and one transparent lower port to provide for the exclusion of water from the interior of the float.

It is also an important object of the invention to provide such a viewing float which has a lensing action in combination with the water for correction or alteration of apparent distances.

It is another object of the invention to provide such a float of improved hydrodynamic configuration that makes it easily propelled by a swimmer.

An additional object is to provide a swimmer's underwater viewing float in which visual interference by reflection of overhead light is substantially if not entirely eliminated for better viewing of the underwater objects.

It is a still further object of the invention to provide a viewing float possessing the aforenoted advantages which can be inexpensively produced and easily handled and stored when not in use.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
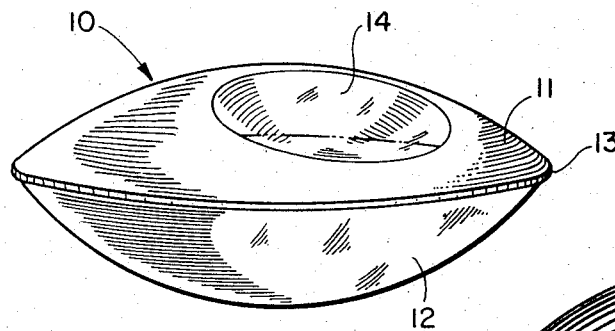
FIG. 1 is a perspective view of a swimmer's viewing float in accordance with the present invention.
Figure 2:
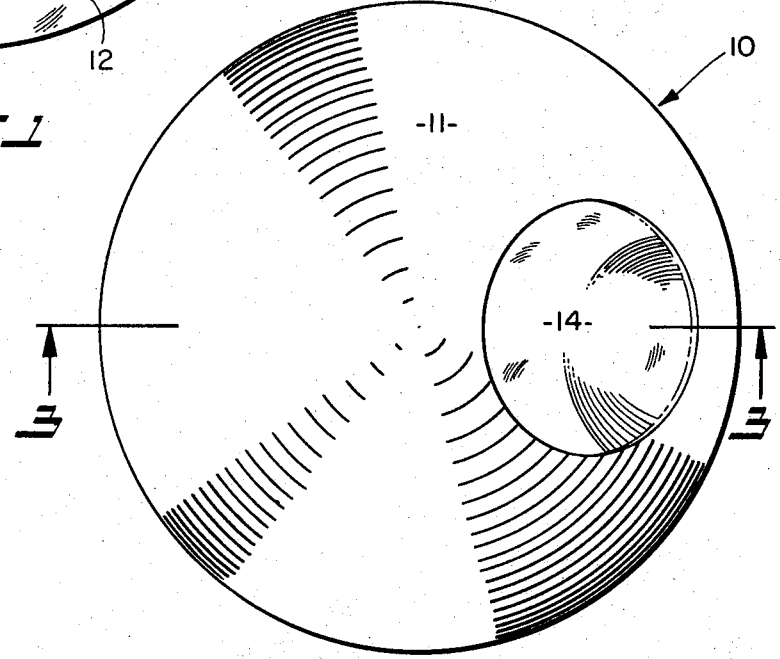
FIG. 2 is a top plan view of the float.

Referring now to the drawing in detail, the float designated generally by reference numeral 10 is of hollow form, generally ellipsoid in any vertical section and circular in any horizontal section, with one exception in an upper area which forms a viewing port to be described more fully below. The outside diameter can be on the order of 18 inches while the vertical centerline height can be on the order of 6 to 10 inches.

Figure 3:
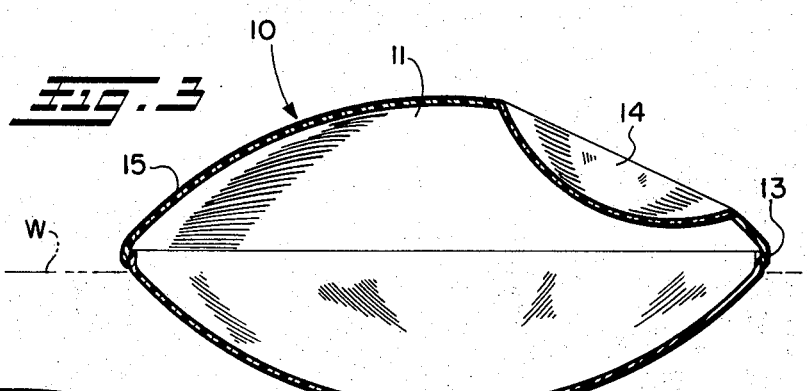
FIG. 3 is a diametrical sectional view of the float as indicated by the lines 3—3 in FIG. 2.

This float is made of upper and lower generally spherical sections 11 and 12, respectively, suitably bonded about their perimeters, for example, with overlapping edges as shown at 13 most clearly in FIG. 3. In one embodiment of the invention these sections can be made of thermoformed rigid transparent plastic material, such as vinyl, acrylic, or polycarbonate, thereby providing a rigid, i.e., non-collapsible, float.

A generally spherical depression 14 is formed in the upper part 11 to one side of the central axis, as shown, to define the viewing port for the swimmer using the float and should, of course, be dimensioned comfortably to be beneath the swimmer's face which is, as earlier indicated, held above the surface of the water W for easy breathing. As illustrative, the diameter of this viewing port can be on the order of 7 inches or only slightly larger than the width of a user's face and at a radius of about 4 in. to about 6 inches. Radii of this order result in reflections of overhead light by the viewing port surfaces being largely or entirely outside the user's field of view.

The remaining surface of the upper part 11 of the float, that is, apart from the viewing port 14, is covered either inside or outside with an opaque or highly light-absorbent coating 15 to provide a mask against the entrance of overhead light which precludes reflection from the lower transparent surface to the viewer's eyes. Sufficient rigidity for this improved float can be realized with materials as previously indicated above having a uniform thickness on the order of 0.03 inch.

It will be apparent that the concave viewing port together with the shielded lower surface presents to the user a field of view substantially free from reflected overhead light, with the lower surface in this embodiment by virtue of its curvature providing a degree of magnification or lensing action at the water interface to enhance underwater distance and size perception. A flat surface results in an apparent magnification and causes submerged objects to appear to be about three-quarters of their true distance, while as the radius of curvature decreases, the magnification likewise decreases and apparent distances increase. If the radius is made sufficiently small, objects appear smaller than real size and at greater than actual distance, with the field of view increased, and this last circumstance is in many circumstances desirable. While the lower surface may range from flat to radii as small as 6 inches without visual difficulty, radii of curvature of about 12 inches have been found highly suitable for general use.

Within the parameters indicated, an airtight float of the illustrated configuration can be provided having a buoyant force of between 10 to 50 pounds when submerged for acceptably low hydrodynamic drag and hence ready maneuverability by the swimmer. It will be appreciated that the two sections can be joined by cement, heat sealing or other means to ensure water tightness of the joint thereof, and further that the opaque or light-absorbing finish on the upper part can be applied to the interior as well as to the exterior surface as shown. It may be desirable to provide the upper part with a removable plug, not shown, to ventilate the interior of the float to eliminate fogging if occurring, and it will be further appreciated that the upper part could be formed itself of an opaque or light-absorbent material, including even metal, except for the transparent port.

Figure 4:
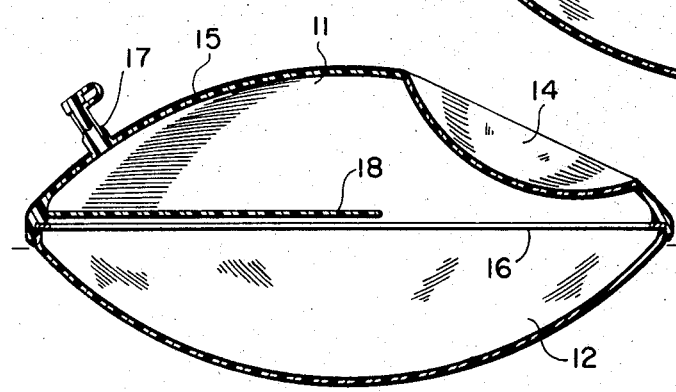
FIG. 4 illustrates in comparable sectional view a modified form of the float.

The modified form of the float shown in FIG. 4 includes a number of features which are not necessarily mutually exclusive. For example, a strengthening ring 16 of metal may be included at the joint 13 between the upper and lower sections of the device for added rigidity. The upper and/or lower parts may alternatively be made of flexible material, in which case a suitable inexpensive valve 17 of conventional form is provided for inflating the float when intended for use and collapsing of the same partially or fully for storage when not in use.

The modification of FIG. 4 also includes an intermediate sheet of opaque plastic 18 integral with the upper part 11 for masking purposes. This form of mask can be used with or without the opacity of the upper part as previously described.

In the collapsible or partially collapsible form of the float, it is desirable that the viewing port be made of rigid plastic to ensure its proper use configuration. And it will be also appreciated that different shapes for the same may be used, including a flat sheet but, of course, retaining the curvature of the lower part 12 for the lensing action in this case. The curved form of port is, as disclosed, nevertheless, preferred to ensure that reflections reaching the eyes of the swimmer come principally from his own face, which being directed downward, is generally not brightly illuminated. Reflections from the face, therefore, ordinarily present little or no interference in the field of view.

There is thus a wide variety of choice of materials, configurations, and sizes which can meet the objectives of providing a watertight, readily maneuverable, swimmer's viewing buoyant device or float having, basically, a lensing action for control of apparent distances and protection against reflected light by the optical surfaces which would interfere with the field of view.

I, therefore, particularly point out and distinctly claim as my invention:

1. A viewing device for viewing objects beneath a water surface from a location above the water surface comprising; a transparent upper viewing port adapted to be spaced above a water surface in direct exposure to atmosphere and being spaced above a transparent lower member adapted to be submerged beneath the water surface, said upper viewing port and said lower member having a sealed hollow space therebetween, said viewing port having a sufficient area for viewing therethrough by a person with both eyes simultaneously, said viewing port being downwardly concave at a predetermined radius and having substantially parallel upper and lower viewing port surfaces so that light reflected off said viewing port is not visible to a person looking through said viewing port with his head in close proximity thereto.

2. The device of claim 1 wherein said lower member is downwardly concave and has substantially parallel upper and lower surfaces for providing a lensing action with the water in which it is submerged.

3. The device of claim 2 wherein said lower member has a substantially larger area than said viewing port.

4. The device of claim 1 wherein said lower member has a substantially larger area than said viewing port.

5. The device of claim 1 wherein said lower member comprises substantially the entire lower part of a buoyant float having an upper part, said hollow space occupying substantially the entire interior of said float between said upper and lower parts, said viewing port being in said upper part.

6. The device of claim 5 wherein said lower part has a substantially greater area than said viewing port.

7. The device of claim 6 and further including masking means for shielding said lower part from transmission of light through said upper part to substantially eliminate reflections from said lower part.

8. The device of claim 7 wherein said masking means includes a transverse shield intermediate said upper and lower parts for blocking transmission of light through said upper part to said lower part.

9. The device of claim 5 wherein said viewing port is integral with said upper part.

10. The device of claim 5 wherein said lower part is downwardly concave and has substantially parallel upper and lower surfaces.

11. The device of claim 5 wherein said float is at least partially collapsible and further including valve means communicating with said hollow space for selectively inflating or deflating said float.

12. The device of claim 5 wherein said upper part has a substantially greater area than said viewing port therein and said upper part does not transmit light therethrough to said lower part.

13. A combination float and viewing device for at least partially supporting a person on a water surface with his head above the water surface and for viewing objects beneath the water surface from a location above the water surface comprising; spaced upper and lower parts having a sealed space therebetween and being of substantially equal area, said lower part being transparent and being adapted to be submerged beneath the water surface, said lower part being downwardly concave and including substantially parallel upper and lower surfaces to provide a lensing action with the water, a transparent viewing port in said upper part having an area substantially less than the total area of said upper part, said upper part being masked against transmission of light therethrough to said lower part except in the area of said viewing port, said viewing port having substantially parallel upper and lower viewing port surfaces and being downwardly concave at a predetermined radius so that light reflected off said viewing port is not visible to a person looking through said port with his head in close proximity thereto.

* * * * *